UNITED STATES PATENT OFFICE.

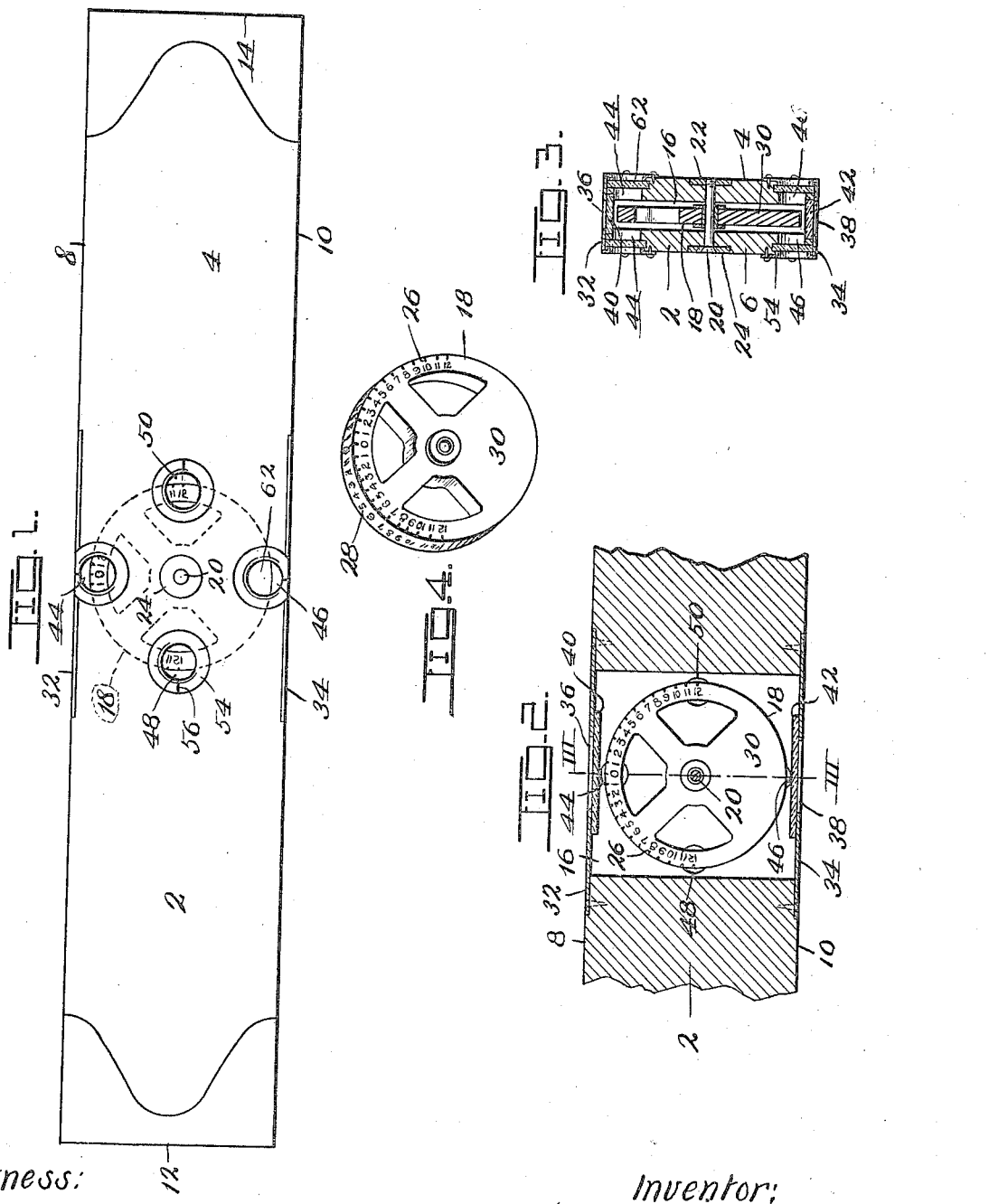

CLYDE E. WYCKOFF, OF KANSAS CITY, MISSOURI, ASSIGNOR OF ONE-HALF TO JOHN Q. MOFFAT AND ONE-HALF TO GEORGE E. WHITTEN, BOTH OF KANSAS CITY, MISSOURI.

LEVEL.

1,424,229.   Specification of Letters Patent.   Patented Aug. 1, 1922.

Application filed September 28, 1920. Serial No. 413,261.

*To all whom it may concern:*

Be it known that I, CLYDE E. WYCKOFF, a citizen of the United States, residing at Kansas City, in the county of Jackson and State of Missouri, have invented certain new and useful Improvements in Levels, of which the following is a specification.

My invention relates to new and useful improvements in levels and one object is to provide a device of this character which may be employed to advantage by different kinds of mechanics and engineers in the construction of buildings, in determining the angles and lengths to which rafters and other timbers are to be cut, and also in ascertaining whether various objects are out of plumb so that such defect can be easily and quickly corrected.

A further object is to provide a device of this character which can be employed to advantage by road builders and others in determining grades and levels.

One important feature of the invention is the provision of a plurality of sight openings in the sides of the level which enable a dial mounted within said level to be read from any of said sides and thus obviates the necessity of placing the level on any particular side before it can be read.

In the accompanying drawing I have illustrated the preferred embodiment of the invention, but it is to be understood that the invention is not necessarily limited thereto as various changes in the shape, proportions and arrangement of parts may be resorted to which fairly fall within the spirit and scope of the invention as claimed.

In said drawing:

Fig. 1 is a side elevation of the level.

Fig. 2 represents a fragmentary longitudinal section of the level.

Fig. 3 is a cross section on line III—III of Fig. 2.

Fig. 4 is a detail perspective view of a rotary dial forming part of the invention.

In carrying out the invention, I employ a stock 2 which may be made of any material and in any desired size. Said stock 2 has sides 4, 6, 8 and 10, and ends 12 and 14. The stock 2 also has a central opening 16 extending therethrough from edge to edge to receive a rotary one-piece dial 18, which is freely mounted upon a shaft 20 extending transversely through the stock 2 and secured in plates 22 and 24 which are countersunk in the sides 4 and 6, respectively, of the stock.

The dial 18 has segmental scales 26 on each side and a peripheral scale 28. It is also weighted below its axis as indicated at 30 to retain the zero marks of the respective scales in uppermost position irrespective of whether the level is placed on either side 8 or 10 or either end 10 or 14. The scales 26 and 28 may be graduated in different ways to suit the work to which the level is to be placed. The ends of the opening 16 are closed by metal plates 32 and 34 having sight openings 36 and 38, covered by small plates of glass 40 and 42, respectively.

The side 4 of the stock 2 has four equally spaced sight openings 44, 46, 48 and 50, which are arranged in a circle corresponding to the diameter of the scales 26 and in line with corresponding sight openings in the side 6 of the stock. Dust and other foreign matter is prevented from entering the openings 46 to 50, inclusive, by glass plates 62 which are held in position by flanged metal eyelets 54, each of which is provided with an index mark 56 to aid in reading the scales 26 on the dial 18.

By providing the stock 2 with all of the sight openings above described, it will be readily understood that when said stock 2 is laid upon its side 10 the scale 28 on the periphery of the dial 18 can be viewed through the sight opening 36 while the scales 26 can be read from the sides 4 and 6 through the sight openings 40, 44 and 50. If the stock 2 is placed on its side 8 the peripheral scale 28 can be read through the sight opening 38 while the side scales 26 can be read through the sight openings 40, 46 and 50, at the sides 4 and 6 of the stock 2. If the stock 2 is stood upon its end 12 the peripheral scale 28 can be read through either of the sight openings 36, 38, while the side scales 26 can be read through the sight openings 44, 50 and 46. If the stock 2 is stood upon its end 14 the peripheral scale 28 can be read through either of the sight openings 36 or 38, while the side scales 26 can be read through the openings 40, 44 and 46.

The manner of ascertaining levels, plumb lines, and various pitches or degrees between the horizontal and perpendicular is well known and it is therefore deemed unnecessary to give a detailed explanation thereof at this time.

From the foregoing description it will be understood that the scales on the dial 18 can be easily read irrespective of whether the stock 2 is placed upon its sides 8 and 10 or its ends 12 and 14, and hence the device is much more convenient to use than a level which can be read from one side only.

Having thus described my invention, what I claim and desire to secure by Letters Patent, is:

A device of the character described consisting of a stock having an opening therein, a one-piece dial rotatably arranged in said opening and weighted to maintain the same relative position irrespective of the position in which the stock is placed, scales on the sides of said dial, there being a plurality of equally-spaced sight openings arranged in circles in the opposite sides of the stock through which the scales may be viewed, and glass plates to close said sight openings, there being a peripheral scale on the dial, and oppositely-disposed sight openings in the stock through which said peripheral scale may be viewed, substantially as described.

In testimony whereof I affix my signature, in the presence of two witnesses.

CLYDE E. WYCKOFF.

Witnesses:
L. J. FISCHER,
F. C. FISCHER.